United States Patent
Chinnaiah et al.

(10) Patent No.: US 7,570,662 B2
(45) Date of Patent: Aug. 4, 2009

(54) SYSTEM AND METHOD FOR MULTIPLEXING, FRAGMENTING, AND INTERLEAVING IN A COMMUNICATIONS ENVIRONMENT

(75) Inventors: Durai Chinnaiah, San Jose, CA (US); Tmima Koren, Cupertino, CA (US); Muthumayan Madhayyan, Santa Clara, CA (US); Jagdish V. Sonti, Cupertino, CA (US); Kirankumar Vishnubhatla, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 855 days.

(21) Appl. No.: 10/946,559

(22) Filed: Sep. 21, 2004

(65) Prior Publication Data
US 2006/0062253 A1 Mar. 23, 2006

(51) Int. Cl.
*H04J 3/24* (2006.01)
(52) U.S. Cl. .............. 370/473; 370/230.1; 370/535
(58) Field of Classification Search ............ 370/230, 370/230.1, 231, 235, 352, 353, 392, 395.42, 370/395.52, 395.6, 465, 473, 474, 535, 537, 370/538, 540
See application file for complete search history.

(56) References Cited

U.S. PATENT DOCUMENTS

| | | | |
|---|---|---|---|
| 5,894,557 A | 4/1999 | Bade et al. ............. | 395/200.58 |
| 6,134,245 A | 10/2000 | Scarmalis ................ | 370/474 |
| 6,192,051 B1 | 2/2001 | Lipman et al. ............ | 370/389 |
| 6,363,065 B1 | 3/2002 | Thornton et al. .......... | 370/352 |
| 6,400,722 B1 | 6/2002 | Chuah et al. ............. | 370/401 |
| 6,477,595 B1 | 11/2002 | Cohen et al. ............. | 710/105 |
| 6,512,754 B2 | 1/2003 | Feder et al. ............. | 370/338 |
| 6,512,773 B1 | 1/2003 | Scott .................. | 370/395.61 |
| 6,577,644 B1 * | 6/2003 | Chuah et al. ............. | 370/466 |
| 6,876,669 B2 * | 4/2005 | Shalom ................. | 370/468 |
| 7,224,703 B2 * | 5/2007 | Antal et al. ............. | 370/473 |
| 7,283,483 B2 * | 10/2007 | Asawa et al. ............. | 370/252 |
| 2003/0161326 A1 * | 8/2003 | Pazhyannur et al. ... | 370/395.52 |

FOREIGN PATENT DOCUMENTS

EP 1221798 A2 * 7/2002
WO WO 03/081855 A1 * 10/2003

OTHER PUBLICATIONS

Pazhyannur, R.S. et al., "PPPmux—A New Protocol for Transporting Small IP Packets," IEEE International Conference on Communications, 2001. ICC 2001. Jun. 2001, vol. 8, pp. 2472-2477.*

* cited by examiner

*Primary Examiner*—Donald L Mills
(74) *Attorney, Agent, or Firm*—Baker Botts L.L.P.

(57) ABSTRACT

A method for communicating data is provided that includes receiving a plurality of bits associated with a communications flow. The method also includes configuring multiplexing for a link, which is selected for transmission of data, by using a maximum fragment parameter associated with the link. The maximum fragment parameter is used as an upper limit whereby if the maximum fragment parameter is smaller than a maximum multiplex parameter, an incoming packet is multiplexed only to the maximum fragment parameter size such that multiplexed packets are not fragmented.

35 Claims, 3 Drawing Sheets

SYSTEM AND METHOD FOR MULTIPLEXING, FRAGMENTING, AND INTERLEAVING IN A COMMUNICATIONS ENVIRONMENT

TECHNICAL FIELD OF THE INVENTION

The present invention relates in general to the field of communications and, more particularly, to a system and a method for multiplexing, fragmenting, and interleaving in a communications environment.

BACKGROUND OF THE INVENTION

Communication systems and architectures have become increasingly important in today's society. One aspect of communications relates to maximizing bandwidth and minimizing delays associated with data and information exchanges. Many architectures for effectuating proper data exchanges add significant overhead and cost in accommodating a large number of end-users or data streams. For example, a large number of T1/E1 lines may be implemented to accommodate heavy traffic, but such lines are generally expensive and, thus, usage of each one should be maximized in order to achieve optimal system performance. In the context of such optimizations, a number of competing protocols may be used to process and to route traffic. In some cases, such protocols may be at odds with each other such that certain network operations are redundant or certain network benefits are diminished. This results in poor system performance as these protocols do not cooperate effectively.

Accordingly, the ability to provide a communications system that consumes few resources, that optimizes bandwidth, and that achieves effective cooperation amongst protocols presents a significant challenge for network operators, service providers, and system administrators.

SUMMARY OF THE INVENTION

From the foregoing, it may be appreciated by those skilled in the art that a need has arisen for an improved communication approach that optimizes data exchanges in a communications environment. In accordance with one embodiment of the present invention, a system and a method for providing multiplexing, fragmenting, and interleaving are provided that substantially eliminate or greatly reduce disadvantages and problems associated with conventional communication techniques.

According to one embodiment of the present invention, there is provided a method for communicating data that includes receiving a plurality of bits associated with a communications flow. The method also includes configuring multiplexing for a link, which is selected for transmission of data, by using a maximum fragment parameter associated with the link. The link maximum fragment parameter is used as an upper limit whereby if the link maximum fragment parameter is smaller than a maximum multiplex parameter, an incoming packet is multiplexed only to the link maximum fragment parameter size such that multiplexed packets are not fragmented.

Certain embodiments of the present invention may provide a number of technical advantages. For example, according to one embodiment of the present invention, a communications approach is provided that enhances network communications by targeting the link configuration parameter 'link max fragment size' (MAXFRAGLINK), which can be used when multiplexing packets with point to point protocol multiplex (PPP-Mux). PPPMux has its own configuration parameter 'max multiplexed packet size' (MAXMUX) to determine the size of the multiplexed packet that it should generate. If MAXFRAGLINK<MAXMUX, then MAXFRAGLINK can be used to limit the PPPMux packet size instead of MAXMUX. This operation has a number of advantages. For example, such a procedure saves processing time and avoids multiplexing followed by fragmentation operations. In addition, such an architecture allows interleaving of muxed packets by generating them in a size that would not have to be fragmented before sending them over the link. Additionally, such an approach optimizes bandwidth as each link is efficiently utilized based on its capacity and its permissible delay.

Certain embodiments of the present invention may enjoy some, all, or none of these advantages. Other technical advantages may be readily apparent to one skilled in the art from the following figures, description, and claims.

BRIEF DESCRIPTION OF THE DRAWINGS

For a more complete understanding of the present invention and the advantages thereof, reference is made to the following description taken in conjunction with the accompanying drawings, wherein like reference numerals represent like parts, in which.

DETAILED DESCRIPTION OF THE INVENTION

Figure 1:
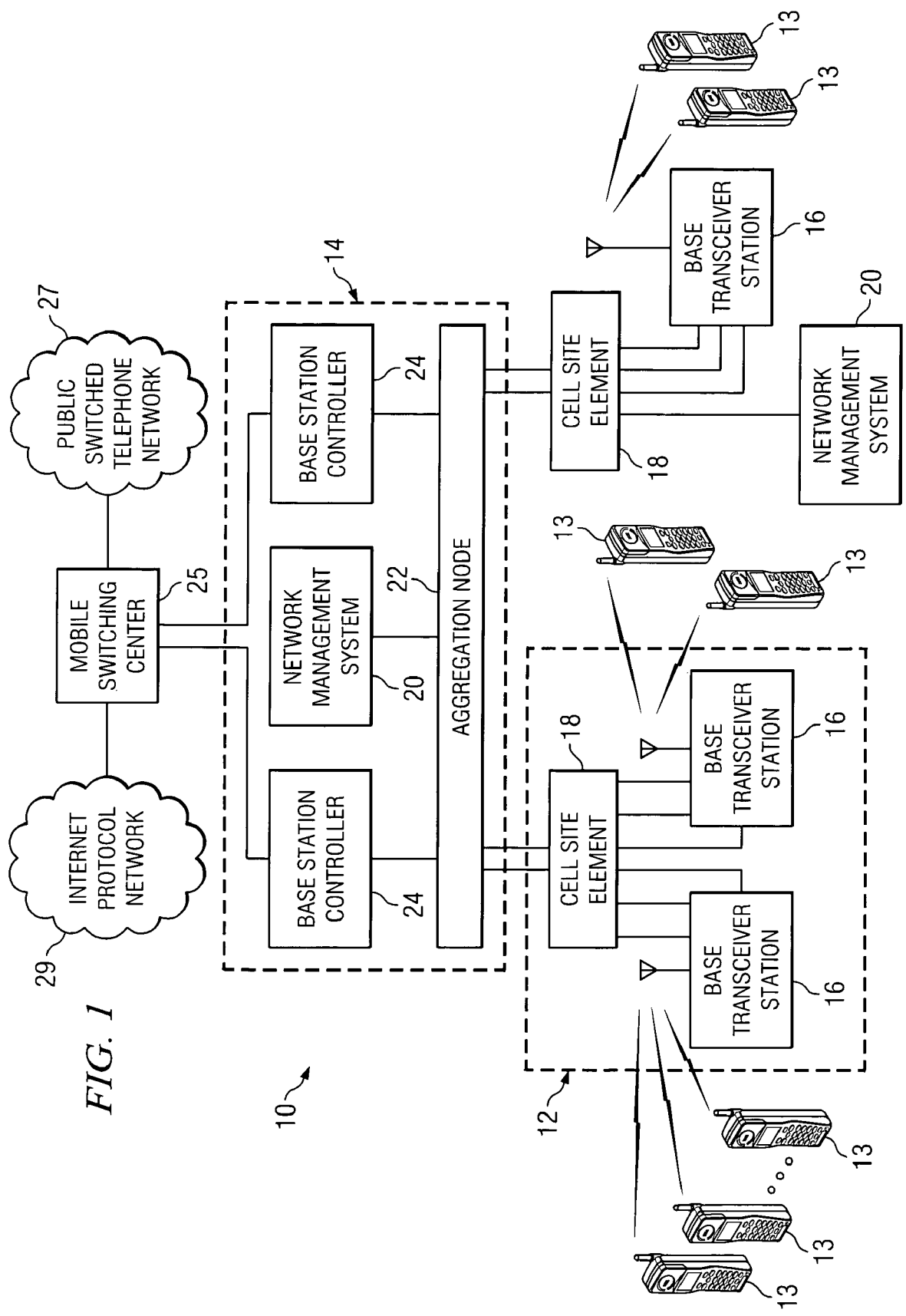
FIG. 1 is a simplified block diagram of a communication system for multiplexing, fragmenting, and interleaving in a communications environment in accordance with one embodiment of the present invention.

FIG. 1 is a simplified block diagram of a communication system 10 for the propagation of data in a communications environment. Communication system 10 may include a plurality of cell sites 12, a plurality of mobile stations 13, a central office site 14, a plurality of base transceiver stations 16, a plurality of cell site elements 18, and a network management system 20. Additionally, communication system 10 may include an aggregation node 22, a plurality of base station controllers 24, a mobile switching center 25, a public switched telephone network (PSTN) 27, and an Internet protocol (IP) network 29. Note that there is a disproportionate number of communications links extending between cell site element 18 and aggregation node 22, as compared to the number of communication links extending between cell site element 18 and base transceiver stations 16. This arrangement has been provided in order to illustrate a network communication scenario being achieved by communication system 10.

Communication system 10 may generally be configured or arranged to represent a 2.5G architecture applicable to a Global System for Mobile (GSM) environment in accordance with a particular embodiment of the present invention. However, the 2.5G architecture is offered for purposes of example only and may alternatively be substituted with any suitable networking system or arrangement that provides a communicative platform for communication system 10. For example, the present invention may be used in conjunction with data communications, such as those that relate to packet data transmissions. Additionally, communication system 10 may be provided in a 3G network, where 3G equivalent networking equipment is provided in the architecture. Communication system 10 is versatile in that it may be used in a host of communications environments such as in conjunction with any time division multiple access (TDMA) element or protocol for example, whereby signals from end-users, subscriber units, or mobile stations 13 may be multiplexed over the time domain.

Note that for purposes of teaching and discussion, it is useful to provide some overview as to the way in which the following invention operates. The following foundational information may be viewed as a basis from which the present invention may be properly explained. Such information is offered earnestly for purposes of explanation only and, accordingly, should not be construed in any way to limit the broad scope of the present invention and its potential applications.

Point to point multiplex (PPPMux) (identified in RFC 3153) and other link optimization techniques are statically configured. The parameters configured for PPPMux (and any such scheme) such as max frame length (as well as mux timer value) are configured per multilink bundle.

Transport nodes (e.g. routers) are generally co-located with radio nodes (base stations and base station controllers). Connectivity between radio nodes can be achieved through co-located/connected routers, which are in turn connected by low-speed transmission links such as T1s, E1s, etc. The network devices (e.g. routers) at both ends of the low-speed links perform link efficiency techniques such as compression and multiplexing to push more data over these expensive leased lines. PPPMux multiplexes a number of compressed user datagram protocol (UDP)/IP packets such that Layer 2 overhead is amortized over a number of packets. Current algorithms in PPPMux ship out a packet when either the max frame size is exceeded OR the mux timer expires.

For backhauling radio traffic over IP based backhaul, routers are used at each end of the wide area network (WAN) connection to compress headers, mux packets, and loadbalance traffic over multiple links. PPP is the protocol running over each individual link and multilink PPP (MLPPP) (identified in RFC 1990) is used to create a virtual bundle.

In PPP, two protocols are present that have the opposite effect. PPPMux multiplexes several PPP packets into one larger PPP packet, while multilink fragmentation splits one PPP packet into several smaller PPP packets. When both protocols are used on the same PPP link, a situation is presented where packets are multiplexed together into a larger packet and then fragmented before being sent over the PPP link. This can occur when fractional span support is needed in the solution. A number of alternatives are presented herein to solve this issue.

Communication system 10 coordinates two competing protocols: PPPMux and multilink fragmentation. PPPMux combines several PPP packets into one larger PPP packet. The main benefits of muxing are: 1. reduce bandwidth usage (the size of the multiplexed packet is smaller than the combined size of the individual packets before multiplexing); and 2. increase the throughput of the network device (e.g. cell site element 18 or aggregation node 22) by reducing the number of packets that are sent/received by the network device over the PPP interface.

Multilink fragmentation is used to reduce the size of the packets that are sent over a PPP link. There are several reasons why this is necessary: 1. if the packet size is larger than the maximum transmission unit (MTU) of the link, the packet must be fragmented before being sent over the link; and 2. large packets cause a larger delay. If some of the traffic is time sensitive (e.g. high priority), the large packets must be fragmented to reduce the delay they impose on the high priority traffic. Hence, two competing processes are present, one increasing packet size and the other reducing packet size. It is desirable to avoid the situation where packets are muxed together into a larger packet that must be fragmented before traversing the PPP link.

The PPPMux parameters are configurable per multilink bundle. One of the parameters is the maximum size of a multiplexed packet (MAXMUX). Another parameter for a multilink bundle is the maximum delay allowed for high priority packets (MAXDELAY). The link max fragment size (MAXFRAGLINK) is calculated per link based on MAXDELAY, the link capacity and the link MTU. When the links in a bundle have different bandwidth (for example one link is a full T1 and the other is a fractional T1), the calculated MAXFRAGLINK will be different for those links.

If packets are multiplexed based on MAXMUX, it may be necessary to fragment the muxed packet if its size is larger than the MAXFRAGLINK of the individual link over which the packet is about to be sent. There are a few disadvantages to the above procedure: 1. processing time is wasted by first multiplexing the packets and then fragmenting the packet back to smaller fragments; 2. a fragmented packet cannot be interleaved. If the muxed packet was intended to be interleaved between fragments of another packet to minimize the delay of this high priority packet, this cannot be done anymore if the packet has to be fragmented; and 3. if the large muxed packet is sent unchanged over the link, it will cause unacceptable delay to other packets.

Another approach to resolve the issue is to use MAXFRAGLINK of the smallest link in the bundle as MAXMUX if MAXFRAGLINK<MAXMUX. The disadvantage of this approach is reduced muxing efficiency, which yields less bandwidth savings on the links. Also a larger number of packets are sent over the links, which affects the performance of the network device.

The proposed solution of communication system 10 is to tailor the multiplexing to each link by using MAXFRAGLINK (of the link chosen for transmission) as an upper limit in the PPPMux process. If MAXFRAGLINK is smaller than MAXMUX, multiplex the packet only to MAXFRAGLINK size. This ensures that multiplexed packets will not have to get fragmented and that each link will be utilized efficiently and with the appropriate delay.

The scheme can also be used in conjunction with other protocols (e.g. ATMmux and ATMoL2TPv3 applications) to limit the number of cells packed in a packet, while making the packets eligible for interleaving.

Hence, communication system 10 can utilize the link configuration parameter 'link max fragment size' (MAXFRAGLINK) when multiplexing packets with PPPMux. PPPMux has its own configuration parameter 'max multiplexed packet size' (MAXMUX) to determine the size, of the multiplexed packet it should generate. If MAXFRAGLINK<MAXMUX, MAXFRAGLINK can be used to limit the PPPMux packet size instead of MAXMUX.

This operation has a number of advantages. For example, such a procedure saves processing time and avoids multiplexing followed by fragmentation operations. In addition, the present architecture allows interleaving of muxed packets by generating them in a size that would not have to be fragmented before sending them over the link. Additionally, such an approach optimizes bandwidth as each link is efficiently utilized based on its capacity and its allowed delay.

Mobile station 13 may be used to initiate a communication session that may benefit from such a communications protocol. Mobile station 13 may be an entity, such as a client, subscriber, end-user, or customer that seeks to initiate a data flow or exchange in communication system 10 via any suitable network. Mobile station 13 may operate to use any suitable device for communications in communication system 10. Mobile station 13 may further represent a communications interface for an end-user of communication system 10. Mobile station 13 may be a cellular or other wireless telephone, an electronic notebook, a computer, a personal digital assistant (PDA), or any other device, component, or object capable of initiating a data exchange facilitated by communication system 10. Mobile station 13 may also be inclusive of any suitable interface to the human user or to a computer, such as a display, microphone, keyboard, or other terminal equipment (such as for example an interface to a personal computer or to a facsimile machine in cases where mobile station 13 is used as a modem). Mobile station 13 may alternatively be any device or object that seeks to initiate a communication on behalf of another entity or element, such as a program, a database, or any other component, device, element, or object capable of initiating a voice or a data exchange within communication system 10. Data, as used herein in this document, refers to any type of numeric, voice, video, audio-visual, or script data, or any type of source or object code, or any other suitable information in any appropriate format that may be communicated from one point to another.

Base transceiver stations 16 are communicative interfaces that may comprise radio transmission/reception devices, components, or objects, and antennas. Base transceiver stations 16 may be coupled to any communications device or element, such as mobile station 13 for example. Base transceiver stations 16 may also be coupled to base station controllers 24 (via one or more intermediate elements) that use a landline (such as a T1/E1 line, for example) interface. Base transceiver stations 16 may operate as a series of complex radio modems where appropriate. Base transceiver stations 16 may also perform transcoding and rate adaptation functions in accordance with particular needs. Transcoding and rate adaptation may also be executed in a GSM environment in suitable hardware or software (for example in a transcoding and rate adaptation unit (TRAU)) positioned between mobile switching center 25 and base station controllers 24.

In operation, communication system 10 may include multiple cell sites 12 that communicate with mobile stations 13 using base transceiver stations 16 and cell site element 18. Central office site 14 may use aggregation node 22 and base station controllers 24 for communicating with cell site 12. One or more network management systems 20 may be coupled to either cell site 12 and central office site 14 (or both as desired), whereby mobile switching center 25 provides an interface between base station controllers 24 (of central office site 14) and PSTN 27, IP network 29, and/or any other suitable communication network. Base transceiver stations 16 may be coupled to cell site element 18 by a T1/E1 line or any other suitable communication link or element operable to facilitate data exchanges. A backhaul connection between cell site element 18 and aggregation node 22 may also include a T1/E1 line or any suitable communication link where appropriate and in accordance with particular needs.

Base station controllers 24 generally operate as management components for a radio interface. This may be done through remote commands to a corresponding base transceiver station within a mobile network. One base station controller 24 may manage more than one base transceiver stations 16. Some of the responsibilities of base station controllers 24 may include management of radio channels and assisting in handoff/handover scenarios.

In operation, layer one based (e.g. time division multiplexed (TDM), GSM, 8.60) or layer two based (e.g. Frame Relay, high level data link control (HDLC), asynchronous transfer mode (ATM), point to point protocol (PPP) over HDLC) traffic may be communicated by each base transceiver station 16 to cell site element 18 of cell site 12. Cell site element 18 may also receive IP or Ethernet traffic from network management system 20. Cell site element 18 may multiplex together payloads from the layer two based traffic that have a common destination. The multiplexed payloads, as well as any payloads extracted from the network management system IP or Ethernet traffic may be communicated across a link to aggregation node 22 within central office site 14. Aggregation node 22 may demultiplex the payloads for delivery to an appropriate base station controller 24 or network management system 20.

Mobile switching center 25 operates as an interface between PSTN 27 and base station controllers 24, and potentially between multiple other mobile switching centers in a network and base station controller 24. Mobile switching center 25 represents a location that generally houses communication switches and computers and ensures that its cell sites in a given geographical area are properly connected. Cell sites refer generally to the transmission and reception equipment or components that connect elements such as mobile station 13 to a network, such as IP network 29 for example. By controlling transmission power and radio frequencies, mobile switching center 25 may monitor the movement and the transfer of a wireless communication from one cell to another cell and from one frequency or channel to another frequency or channel. In a given communication environment, communication system 10 may include multiple mobile switching centers 25 that are operable to facilitate communications between base station controller 24 and PSTN 27. Mobile switching center 25 may also generally handle connection, tracking, status, billing information, and other user information for communications in a designated area.

PSTN 27 represents a worldwide telephone system that is operable to conduct communications. PSTN 27 may be any land line telephone network operable to facilitate communications between two entities, such as two persons, a person and a computer, two computers, or in any other environment in which data is exchanged for purposes of communication. According to one embodiment of the present invention, PSTN 27 operates in a wireless domain, facilitating data exchanges between mobile station 13 and any other suitable entity within or external to communication system 10.

IP network 29 is a series of points or nodes of interconnected communication paths for receiving and transmitting packets of information that propagate through communication system 10. IP network 29 offers a communications interface between mobile stations 13 and any other suitable network equipment. IP network 29 may be any local area network (LAN), metropolitan area network (MAN), wide area network (WAN), wireless local area network (WLAN), virtual private network (VPN), or any other appropriate architectural system that facilitates communications in a network environment. IP network 29 implements a transmission control protocol/Internet protocol (TCP/IP) communication language protocol in a particular embodiment of the present invention. However, IP network 29 may alternatively implement any other suitable communications protocol for transmitting and receiving data packets within communication system 10.

Figure 2:
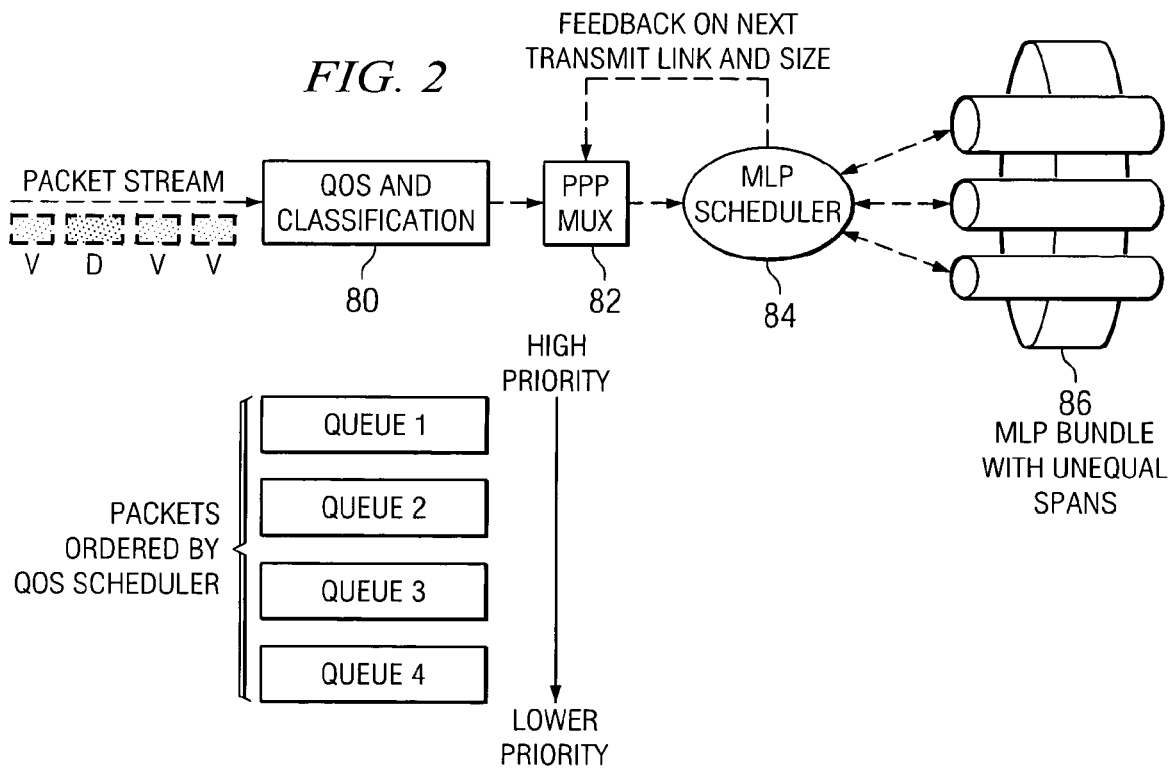
FIG. 2 is a simplified example process flow of the communication system.

Before turning to FIG. 2, it is critical to note that the use of the terms 'aggregation node' and 'cell site element' herein in this document only connotes an example representation of one or more elements associated with base transceiver station 16 and base station controller 24. These terms have been offered for purposes of example and teaching only and do not necessarily imply any particular architecture or configuration. Moreover, the terms 'cell site element' and 'aggregation node' are intended to encompass any network element operable to facilitate a data exchange in a network environment. Accordingly, cell site element 18 and aggregation node 22 may be routers, switches, bridges, gateways, interfaces, or any other suitable module, device, component, element or object operable to effectuate one or more of the operations, tasks, or functionalities associated with compressing data as implied, described, or offered herein.

Each of these elements may include a compressor and/or a decompressor where appropriate. Additionally, each of these elements may include capabilities and functions that facilitate the operations of tailoring the multiplexing for each link by using MAXFRAGLINK (of the link chosen for transmission) as an upper limit in the PPPMux process. If MAXFRAGLINK is smaller than MAXMUX, these network devices can multiplex the packet only to the MAXFRAGLINK size. This ensures that multiplexed packets will not have to get fragmented and that each link will be utilized efficiently and with the appropriate delay. An additional parameter can be calculated per link, MAXMUXLINK, which is the minimum between MAXMUX and MAXFRAGLINK of the link. This parameter can be used as the upper limit in the PPPMux process when multiplexing a packet to be sent over the link. In an example embodiment, these operations may be achieved via software included in cell site element 18 and/or aggregation node 22. This software may be used to effectuate the applications detailed herein (and with particular reference to FIGS. 2 and 3: the description of which is provided below). Alternatively, such operations may be achieved by any suitable hardware, component, device, application specific integrated circuit (ASIC), additional software, processor, algorithm, erasable programmable ROM (EPROM), electrically erasable programmable ROM (EEPROM), field programmable gate array (FPGA), or any other suitable object that is operable to facilitate such operations. Considerable flexibility is provided by the structure of cell site element 18 and aggregation node 22 in the context of communication system 10. Thus, it can be easily appreciated that such a function could be provided external to cell site element 18 and aggregation node 22. In such cases, such a functionality could be readily embodied in a separate component, device, or module.

Figure 3:
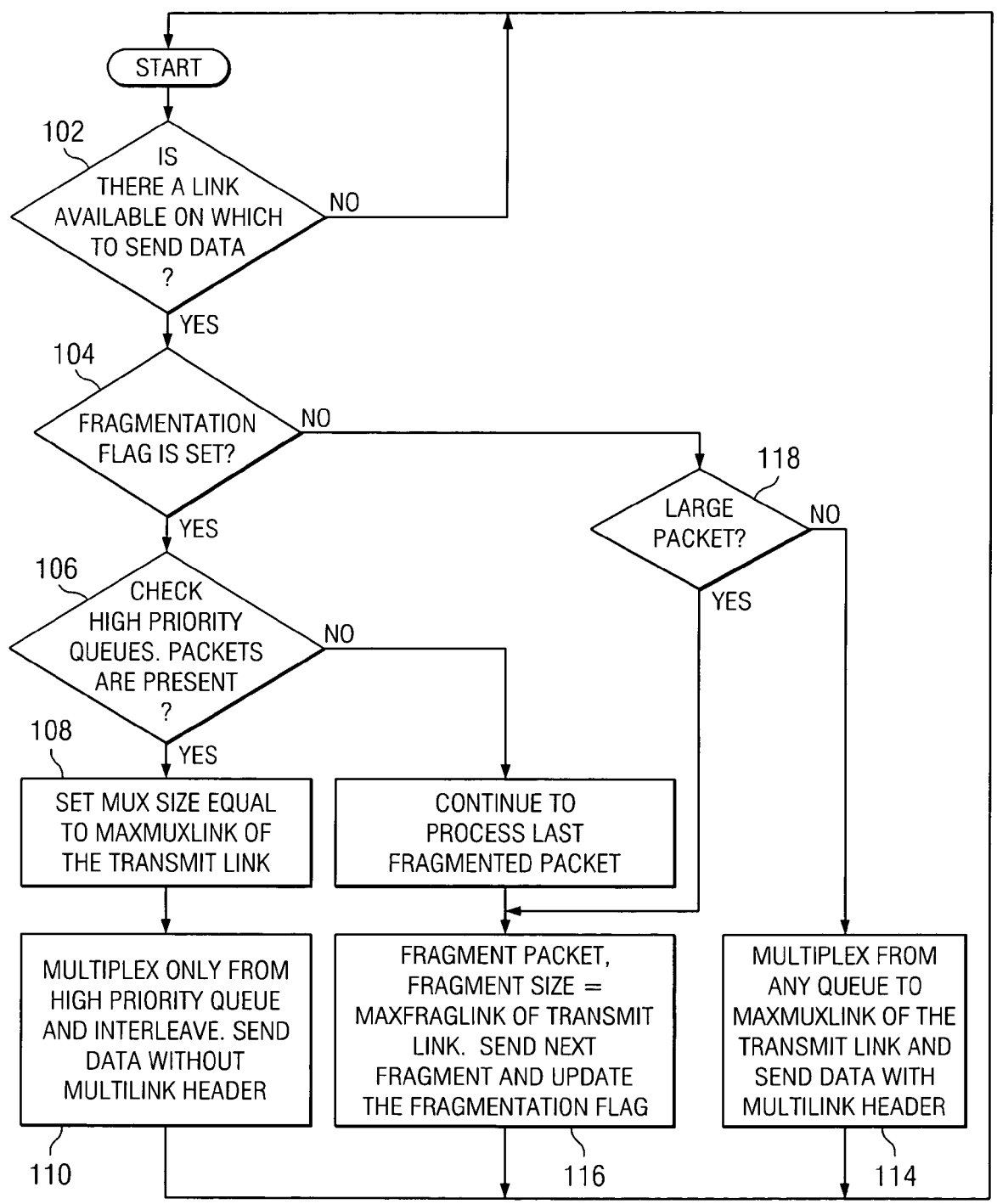
FIG. 3 is a simplified flowchart illustrating a series of example steps associated with the communication system.

FIG. 2 is a simplified example process flow associated with cell site element 18 or aggregation node 22. FIG. 2 offers a broad overview of the way in which communication system 10 may behave. Subsequently, FIG. 3 is used to further detail these operations and processes. The flow may begin where voice and/or data packets may form a packet stream, which arrives at cell site element 18 or aggregation node 22. Once the packets arrive at either location, QoS designations and classifications are made at item 80. In general, classifications are executed first and QoS designations are executed second. The QoS designations translate into a number of queues being used to prioritize the packets. Hence, lower priority packets are placed in lower priority queues and higher priority packets are placed in higher priority queues. At item 82, the MAXMUX can be configured, as well as other decisions executed (as further detailed below with reference to FIG. 3). An MLP scheduler may be provided at block 84. MLP fragmentation and interleaving operations may be preformed at this point. In addition, the MAX delay may be configured at this juncture and the MAXFRAGLINK and MAXMUXLINK may be computed per link. Other operations, such as loadbalancing and encapsulation, may also be executed here. The MLP scheduler may provide feedback to item 82. The feedback can be generally associated with the next transmit link and size. Item 86 illustrates the resulting product, which is an MLP bundle having unequal spans.

FIG. 3 is a simplified flowchart illustrating a series of example steps associated with a method for multiplexing, fragmenting, and interleaving data in a communications environment. The flowchart of FIG. 3 is just one example that illustrates only some of the teachings of communication system 10. The method addresses one type of communications, but may readily be used with numerous other types where appropriate.

Once cell site element 18 is operational, the method may begin at step 102 where it is determined whether there is a link available on which to send the data. At step 104, the fragmentation flag is identified as being set. Note that the fragmentation flag is set when a packet is fragmented and some fragments are transmitted (but not the complete packet). In the case that it is (YES), the priority queues (e.g. high priority queues) are checked at step 106 to see if packets are present. These could include real-time packets that are ready to be sent to a next destination. Once the priority queues are checked and packets are present (YES), the multiplex size is dynamically assigned (i.e. the multiplex size is set to MAXMUXLINK of the link chosen for transmission of packet) at step 108. This determination is based on the link that is designated for transmitting the next packet. In this example (used for purposes of illustration only), the maximum multiplex parameter (MAXMUX) is 256 bytes. The two links are a full T1 link (its computed MAXFRAGLINK and MAXMUXLINK are 256 bytes) and a half T1 link (its computed MAXFRAGLINK and MAXMUXLINK are 128 bytes).

In this example the half T1 link is selected for transmission of the next packet. Because MAXMUXLINK is 128, a 128 byte packet is the largest multiplexed packet that will propagate on the link. From this point, the process may move forward to step 110 where the architecture will only multiplex packets from high priority queues. This step implies that some type of packet selection is executed. This will be conducted until the 128 byte capacity is reached. In addition, during step 110, an interleave operation may be executed. Data is sent without a multilink header.

Note that because the preceding description includes a number of decisions, another description is appropriate to explain some of the alternative routes of the illustrated process. The following description illustrates the case where the fragmentation flag was set, but where there were no packets in the priority queue (i.e. a "NO" resultant for the decision at step 106). Because the fragmentation flag was set, it is known that there are some packets that have been fragmented and that are waiting to be sent. The last fragmented packet continues to be processed. From this point, the process moves to step 116.

This scenario illustrates the case where a full packet was previously transmitted. In the case of no fragmentation (i.e. where step 104 moves to the 'NO' direction), the process moves to step 118, where a decision is made as to whether or not this is a large packet (i.e. bigger than the link MAXFRAGLINK). If it is not a large packet, the process moves to step 114, where multiplexing may be executed from any queue. A large packet could be any packet larger than 128 bytes (i.e. the maximum capacity for the 128 byte link explained in this example). If a large packet is present (YES), the process moves forward to step 116 where a packet is fragmented (fragment size=MAXFRAGLINK of transmit link). The next fragment is then sent and the fragmentation flag is updated. This step can include the process of fragmenting the packet into suitable portions (i.e. 128 byte increments) and setting the fragmentation flag. The fragment is sent and the process returns to step 102, where again a decision is subsequently made about whether or not the fragmentation flag is set at step 104.

In this example, consider that once the last fragment of the packet is sent from step 116, the fragmentation flag is set to 'NO.' The process moves from step 102 to step 104, where the answer is now 'NO.' From this point, the process moves to step 118 where it is determined that this is not a large packet. From step 118, the architecture can multiplex whatever is available and then move to step 114 where the data is sent with a multilink header. Step 114, just like steps 110 and 116, may proceed back to the start of the process.

Some of the steps illustrated in FIG. 3 may be changed or deleted where appropriate and additional steps may also be added to the flowchart. These changes may be based on specific communication system architectures or particular networking arrangements or configurations and do not depart from the scope or the teachings of the present invention.

Although the present invention has been described in detail with reference to particular embodiments illustrated in FIGS. 1 through 3, it should be understood that various other changes, substitutions, and alterations may be made hereto without departing from the spirit and scope of the present invention. For example, although the present invention has been described with reference to a number of elements included within communication system 10, these elements may be rearranged or positioned in order to accommodate any suitable routing and communication architectures. In addition, any of the described elements may be provided as separate external components to communication system 10 or to each other where appropriate. The present invention contemplates great flexibility in the arrangement of these elements as well as their internal components.

In addition, although the preceding description offers a communication protocol to be implemented with particular devices (e.g. aggregation node 22 and cell site element 18), the communication protocol provided may be embodied in a fabricated module that is designed specifically for effectuating the techniques discussed above. Moreover, such a module may be compatible with any appropriate protocol, other than those discussed herein, which were offered for purposes of teaching and example only.

Numerous other changes, substitutions, variations, alterations, and modifications may be ascertained to one skilled in the art and it is intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. An apparatus for communicating data, comprising:
   a cell site element associated with a base transceiver station and operable to:
   receive a plurality of packets associated with a communications flow to be transported over a link, the link being a member of a multilink bundle having a point to point multiplex (PPMux) maximum multiplex parameter designating a maximum size of a multiplexed packet, the link having a PPMux maximum fragment parameter designating a maximum fragment size, the maximum fragment size calculated from a maximum delay for high priority packets;
   determine that the maximum fragment parameter is less than the maximum multiplex parameter; and
   multiplex a received packet only to the maximum fragment size such that the multiplexed received packet is not fragmented.

2. The apparatus of claim 1, wherein the cell site element includes a point to point protocol multiplex (PPPMux) protocol that is operable to multiplex a plurality of PPP packets into one larger PPP packet.

3. The apparatus of claim 1, wherein the cell site element includes a multilink protocol that is operable to fragment a large PPP packet into several smaller PPP packets.

4. The apparatus of claim 1, wherein the cell site element is operable to identify that the link is available for the transmission of data.

5. The apparatus of claim 1, wherein the cell site element is operable to identify whether or not a fragmentation flag is set indicating that a fragmented packet is currently being sent.

6. The apparatus of claim 1, wherein the cell site element is operable to check one or more priority queues in order to identify if one or more packets are present in the priority queues.

7. The apparatus of claim 1, wherein the cell site element is operable to perform PPP multiplexing and multilink interleaving operations for one or more incoming packets.

8. The apparatus of claim 7, wherein the cell site element is operable to perform multiplexing operations in conjunction with the interleaving operations, the multiplexing operations being executed from one or more high priority queues.

9. The apparatus of claim 8, wherein the cell site element is operable to multiplex from additional queues and to send the resulting data with a multilink header.

10. The apparatus of claim 1, further comprising:
    an aggregation node associated with a base station controller and operable to communicate with the cell site element.

11. A method for communicating data, comprising:
    receiving a plurality of bits associated with a communications flow to be transported over a link, the link being a member of a multilink bundle having a point to point multiplex (PPMux) maximum multiplex parameter designating a maximum size of a multiplexed packet, the link having a PPMux maximum fragment parameter designating a maximum fragment size, the maximum fragment size calculated from a maximum delay for high priority packets;
    determining that the maximum fragment parameter is less than the maximum multiplex parameter; and
    multiplexing a received packet only to the maximum fragment size such that the multiplexed received packet is not fragmented.

12. The method of claim 11, further comprising:
    executing a point to point protocol multiple (PPPMux) protocol that is operable to multiplex a plurality of PPP packets into one larger PPP packet.

13. The method of claim 11, further comprising:
    executing a multilink protocol that is operable to fragment a large PPP packet into several smaller PPP packets.

14. The method of claim 11, further comprising:
    identifying that the link is available for the transmission of data.

15. The method of claim 11, further comprising:
identifying whether or not a fragmentation flag is set indicating that a fragmented packet is currently being sent.
16. The method of claim 11, further comprising:
checking one or more priority queues in order to identify if one or more packets are present in the priority queues.
17. The method of claim 11, further comprising:
performing PPP multiplexing and multilink interleaving operations for one or more incoming packets.
18. The method of claim 17, further comprising:
performing multiplexing operations in conjunction with the interleaving operations, the multiplexing operations being executed from one or more high priority queues.
19. The method of claim 18, further comprising:
multiplexing from additional queues; and
sending the resulting data with a multilink header.
20. A system for communicating data, comprising:
means for receiving a plurality of bits associated with a communications flow to be transported over a link, the link being a member of a multilink bundle having a point to point multiplex (PPMux) maximum multiplex parameter designating a maximum size of a multiplexed packet, the link having a PPMux maximum fragment parameter designating a maximum fragment size, the maximum fragment size calculated from a maximum delay for high priority packets;
means for determining that the maximum fragment parameter is less than the maximum multiplex parameter; and
means for multiplexing a received packet only to the maximum fragment size such that the multiplexed received packet is not fragmented.
21. The system of claim 20, further comprising:
means for executing a point to point protocol multiplex (PPPMux) protocol that is operable to multiplex a plurality of PPP packets into one larger PPP packet.
22. The system of claim 20, further comprising:
means for executing a multilink protocol that is operable to fragment a large PPP packet into several smaller PPP packets.
23. The system of claim 20, further comprising:
means for identifying that the link is available for the transmission of data.
24. The system of claim 20, further comprising:
means for identifying whether or not a fragmentation flag is set indicating that a fragmented packet is currently being sent.
25. The system of claim 20, further comprising:
means for checking one or more priority queues in order to identify if one or more packets are present in the priority queues.
26. The system of claim 20, further comprising:
means for performing PPP multiplexing and multilink interleaving operations for one or more incoming packets.

27. Software for communicating data, the software being embodied in a computer readable medium and comprising computer code such that when executed is operable to:
receive a plurality of packets associated with a communications flow to be transported over a link, the link being a member of a multilink bundle having a point to point multiplex (PPMux) maximum multiplex parameter designating a maximum size of a multiplexed packet, the link having PPMux a maximum fragment parameter designating a maximum fragment size, the maximum fragment size calculated from a maximum delay for high priority packets;
determine that the maximum fragment parameter is less than the maximum multiplex parameter; and
multiplex a received packet only to the maximum fragment size such that the multiplexed received packet is not fragmented.
28. The medium of claim 27, wherein the code is further operable to:
execute a point to point protocol multiplex (PPPMux) protocol that is operable to multiplex a plurality of PPP packets into one larger PPP packet.
29. The medium of claim 27, wherein the code is further operable to:
execute a multilink protocol that is operable to fragment a large PPP packet into several smaller PPP packets.
30. The medium of claim 27, wherein the code is further operable to:
identify that the link is available for the transmission of data.
31. The medium of claim 27, wherein the code is further operable to:
identify whether or not a fragmentation flag is set indicating that a fragmented packet is currently being sent.
32. The medium of claim 27, wherein the code is further operable to:
check one or more priority queues in order to identify if one or more packets are present in the priority queues.
33. The medium of claim 27, wherein the code is further operable to:
perform PPP multiplexing and multilink interleaving operations for one or more incoming packets.
34. The medium of claim 33, wherein the code is further operable to:
perform multiplexing operations in conjunction with the interleaving operations, the multiplexing operations being executed from one or more high priority queues.
35. The medium of claim 34, wherein the code is further operable to:
multiplex from additional queues; and
send the resulting data with a multilink header.

* * * * *

UNITED STATES PATENT AND TRADEMARK OFFICE
CERTIFICATE OF CORRECTION

PATENT NO. : 7,570,662 B2
APPLICATION NO. : 10/946559
DATED : August 4, 2009
INVENTOR(S) : Chinnaiah et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1157 days.

Signed and Sealed this

Seventh Day of September, 2010

David J. Kappos
*Director of the United States Patent and Trademark Office*